US009256365B2

(12) United States Patent
Uchiyama et al.

(10) Patent No.: US 9,256,365 B2
(45) Date of Patent: Feb. 9, 2016

(54) FEATURE CALCULATION DEVICE, FEATURE CALCULATION METHOD, AND COMPUTER PROGRAM PRODUCT

(71) Applicant: KABUSHIKI KAISHA TOSHIBA, Minato-ku, Tokyo (JP)

(72) Inventors: Hideaki Uchiyama, Kawasaki (JP); Tomoyuki Shibata, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/109,476

(22) Filed: Dec. 17, 2013

(65) Prior Publication Data
US 2014/0184492 A1    Jul. 3, 2014

(30) Foreign Application Priority Data
Dec. 27, 2012    (JP) ................................. 2012-286047

(51) Int. Cl.
G06F 3/048    (2013.01)
G06F 3/0488    (2013.01)
G06F 3/041    (2006.01)

(52) U.S. Cl.
CPC .......... *G06F 3/04883* (2013.01); *G06F 3/0416* (2013.01)

(58) Field of Classification Search
CPC ........................... G06F 3/04883; G06F 3/0416
USPC ........................ 382/181–183, 186, 187, 190
See application file for complete search history.

(56) References Cited

U.S. PATENT DOCUMENTS 5,610,996 A * 3/1997 Eller .............................. 382/187
2006/0227140 A1* 10/2006 Ramani et al. ................ 345/441

OTHER PUBLICATIONS

Marta C. Gonzalez, et al., "Understanding individual human mobility patterns," Nature, vol. 453, pp. 779-782, Jun. 5, 2008.
Andreas Stohl, "Computation, Accuracy and Applications of Trajectories—A Review and Bibliography," Atmospheric Environment, vol. 32, No. 6, pp. 947-966, Mar. 1998.
Nafiz Arica and Fatos T. Yarman-Vural, "BAS: A Perceptual Shape Descriptor Based on the Beam Angle Statistics," Pattern Recognition Letters, vol. 24, pp. 1627-1639, 2003.
Thi Thuong Huyen Nguyen, Michaël Coustaty and Jean-Marc Ogier, "Bags of Strokes Based Approach for Classification and Indexing of Drop Caps," International Conference on Document Analysis and Recognition, pp. 349-353, 2011.
Background Art Information for concise explanation for Cite No. 3 & 4, Toshiba, Jun. 27, 2013.

\* cited by examiner

*Primary Examiner* — Liliana Cerullo
(74) *Attorney, Agent, or Firm* — Knobbe, Martens, Olson & Bear, LLP (57) ABSTRACT

According to an embodiment, a feature calculation device includes an obtaining unit, a first calculator, and a second calculator. The obtaining unit is configured to obtain a point sequence group comprising a set of point sequences in which a sequence of a plurality of points is fixed. The first calculator is configured to, for each of the point sequences in the point sequence group, calculate a plurality of values related to a curvature of a shape of the point sequence, with a reference point of the point sequence as a reference, and calculate feature quantities based on the plurality of calculated values. The second calculator is configured to calculate a histogram representing a distribution of the feature quantities of each of the point sequences.

7 Claims, 8 Drawing Sheets

FEATURE CALCULATION DEVICE, FEATURE CALCULATION METHOD, AND COMPUTER PROGRAM PRODUCT

CROSS-REFERENCE TO RELATED APPLICATION(S)

This application is based upon and claims the benefit of priority from Japanese Patent Application No. 2012-286047, filed on Dec. 27, 2012; the entire contents of which are incorporated herein by reference.

FIELD

Embodiments described herein relate generally to a feature calculation device, a feature calculation method, and a computer program product.

BACKGROUND

A technology is known in which the features of the shape of a single stroke of a character or a drawing, which is written by hand by a user, are represented by the curvature of the shape.

In the abovementioned conventional technology, at each point constituting a point sequence, an expectation value of the curvature of the shape identified by the point sequence is calculated with the point as the reference; and feature quantities that represent the dimensionality of the points constituting the point sequence are extracted so as to represent the features of the shape identified by the point sequence. For that reason, in the abovementioned conventional technology, the dimensionality of the feature quantities is high and the volume of data increases.

Moreover, in the abovementioned conventional technology, the features of a point sequence group, which is a set of point sequences, cannot be represented directly. Thus, in order to represent the features of the entire point sequence group, the features of each point sequence constituting the point sequence group are extracted. As a result, the volume of data goes on increasing.

DETAILED DESCRIPTION

According to an embodiment, a feature calculation device includes an obtaining unit, a first calculator, and a second calculator. The obtaining unit is configured to obtain a point sequence group comprising a set of point sequences in which a sequence of a plurality of points is fixed. The first calculator is configured to, for each of the point sequences in the point sequence group, calculate a plurality of values related to a curvature of a shape of the point sequence, with a reference point of the point sequence as a reference, and calculate feature quantities based on the plurality of calculated values. The second calculator is configured to calculate a histogram representing a distribution of the feature quantities of each of the point sequences.

Various embodiments will be described below with reference to the accompanying drawings.

First Embodiment

Figure 1:
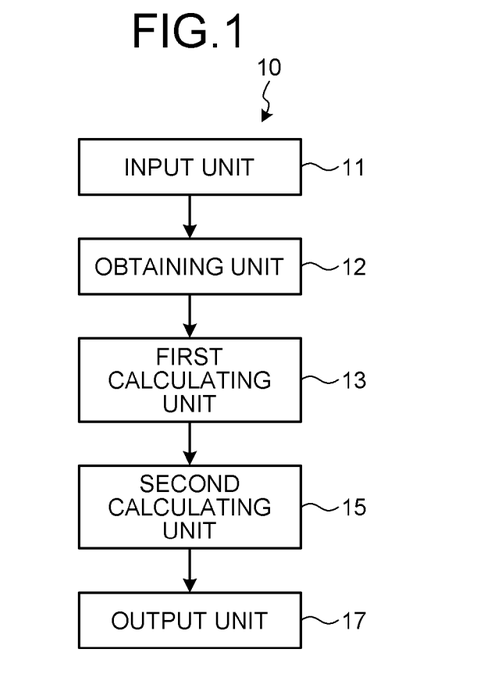
FIG. 1 is a configuration diagram illustrating an example of a feature calculation device according to a first embodiment.

FIG. 1 is a configuration diagram illustrating an example of a feature calculation device 10 according to a first embodiment. As illustrated in FIG. 1, the feature calculation device 10 includes an input unit 11, an obtaining unit 12, a first calculating unit 13, a second calculating unit 15, and an output unit 17.

The input unit 11 can be implemented using an input device such as a touch-sensitive panel, a touch-pad, a mouse, or an electronic pen that enables handwritten input. The obtaining unit 12, the first calculating unit 13, the second calculating unit 15, and the output unit 17 can be implemented by executing computer programs in a processor such as a central processing unit (CPU), that is, can be implemented using software; or can be implemented using hardware such as an integrated circuit (IC); or can be implemented using a combination of software and hardware.

The input unit 11 is used to input a point sequence group (i.e., a plurality of point sequences), which is a set of point sequences in which the sequence of a plurality of points is fixed, to the feature calculation device 10. In the first embodiment, the input unit 11 is used to input handwritten data, which indicates the data of a character or a drawing written by hand by a user, as the point sequence group to the feature calculation device 10.

In the first embodiment, it is assumed that the input unit 11 is a touch-sensitive panel, and that a user inputs handwritten data by writing a character or a drawing on the touch-sensitive panel by hand using a stylus pen or a finger. However, that is not the only possible case. Alternatively, for example, the input unit 11 can also be implemented using a touch-pad, a mouse, or an electronic pen.

The handwritten data is composed of a set of strokes (as an example of point sequences). Herein, "stroke" points to a stroke of a character or a drawing that is input in handwriting by the user, and represents data of the locus from the time when a stylus pen or a finger makes contact with the input screen of the touch-sensitive panel until it is lifted from the input screen (i.e., locus from a pen-down action to a pen-up action). For example, a stroke is expressed as time-series coordinate values, such as $\{(x_1, y_1), (x_2, y_2), \ldots, (x_n, y_n)\}$, of the contact points of the stylus pen or a finger with the input screen.

The obtaining unit 12 obtains the point sequence group that is input from the input unit 11. In the first embodiment, the obtaining unit 12 obtains handwritten data, which is a set of strokes, as the point sequence group from the input unit 11.

The first calculating unit 13 calculates, for each of a plurality of point sequences constituting the point sequence group obtained by the obtaining unit 12, a plurality of values, which are related to the curvature of the shape identified by the point sequence, with the reference point of the point sequence as the reference; and calculates feature quantities based on the calculated values. More particularly, for each of a plurality of point sequences, the first calculating unit 13 calculates a first feature quantity to a C-th feature quantity (where $C \geq 1$) as the feature quantities.

In concrete terms, firstly, with respect to a point sequence $P\{p_1, \ldots, p_{N(N \geq 3)}\}$ that constitutes the point sequence group, the first calculating unit 13 sets a reference point $p_b$. In the first embodiment, it is assumed that each point p constituting the point sequence P is represented as a two-dimensional coordinate having x-coordinate and y-coordinate. However, that is not the only possible case. Alternatively, each point p can be represented as a one-dimensional coordinate or as a coordinate having three or more dimensions.

Figure 2:
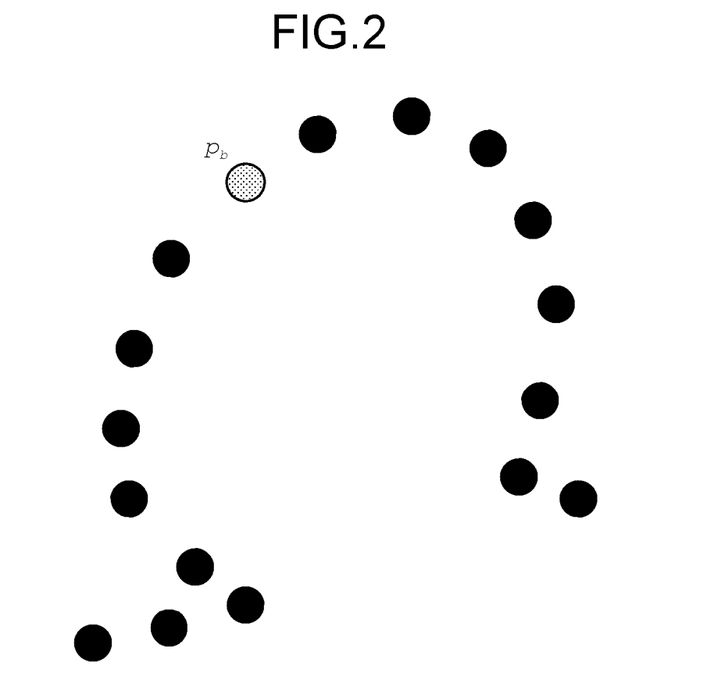
FIG. 2 is an explanatory diagram illustrating exemplary methods of setting a reference point according to the first embodiment.
Figure 3:
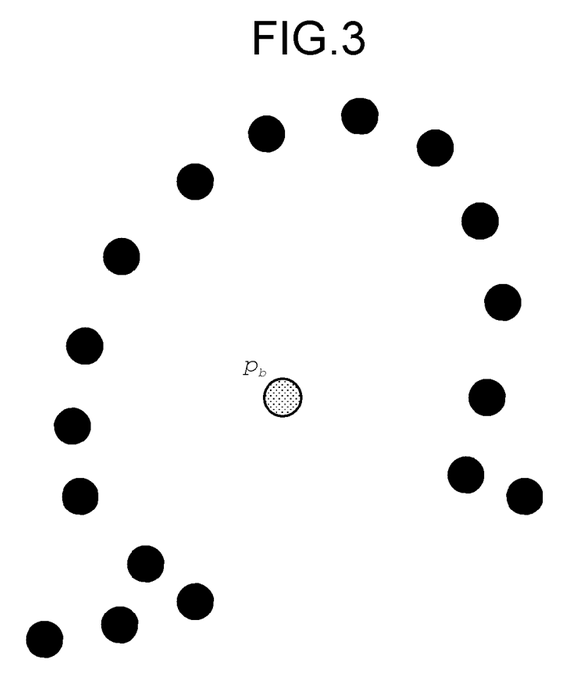
FIG. 3 is an explanatory diagram illustrating an exemplary method of setting a reference point according to the first embodiment.
Figure 4:
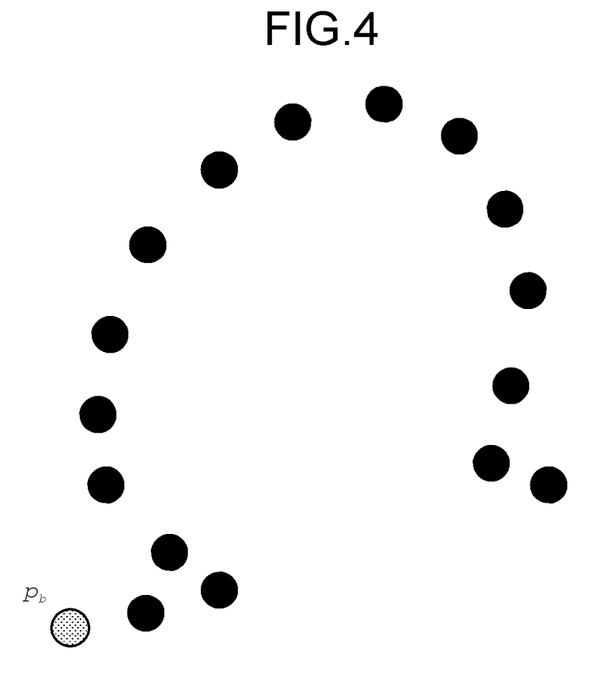
FIG. 4 is an explanatory diagram illustrating an exemplary method of setting a reference point according to the first embodiment.
Figure 5:
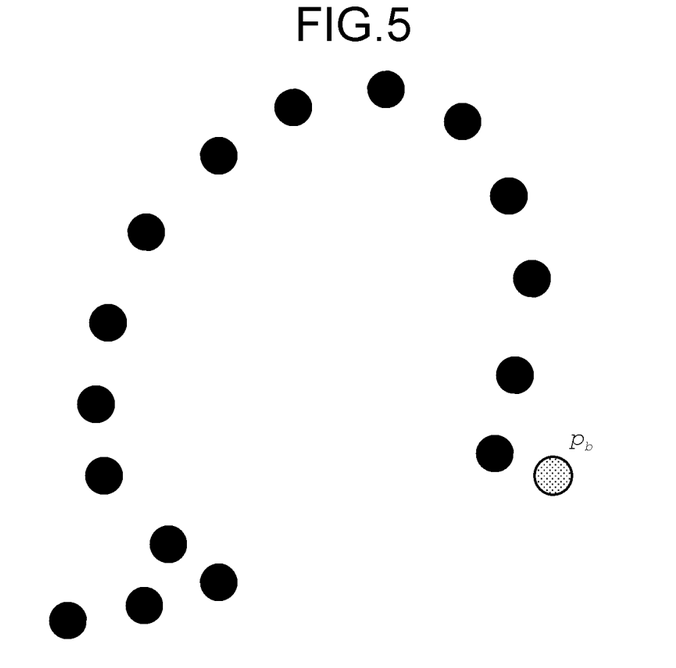
FIG. 5 is an explanatory diagram illustrating an exemplary method of setting a reference point according to the first embodiment.

Herein, with respect to the point sequence P, the first calculating unit 13 can set the reference point $p_b$ in an arbitrary manner. That is, the first calculating unit 13 can set the reference point $p_b$ to any one point that constitutes the point sequence P or to a point other than the points constituting the point sequence P. For example, as illustrated in FIG. 2, the first calculating unit 13 can set the reference point $p_b$ to the center point of the point sequence P. Alternatively, as illustrated in FIG. 3, the first calculating unit 13 can set the reference point $p_b$ to the gravity point of the point sequence P. Still alternatively, as illustrated in FIG. 4, the first calculating unit 13 can set the reference point $p_b$ to the start point of the point sequence P. Still alternatively, as illustrated in FIG. 5, the first calculating unit 13 can set the reference point $p_b$ to the end point of the point sequence P.

Subsequently, from N number of points p that constitute the point sequence P, the first calculating unit 13 selects a pair of two points $p_x$ and $p_y$ for M ($M \geq 1$) number of times. Herein, the first calculating unit 13 can select the pair of points $p_x$ and $p_y$ in an arbitrary manner for M number of times.

Figure 6:
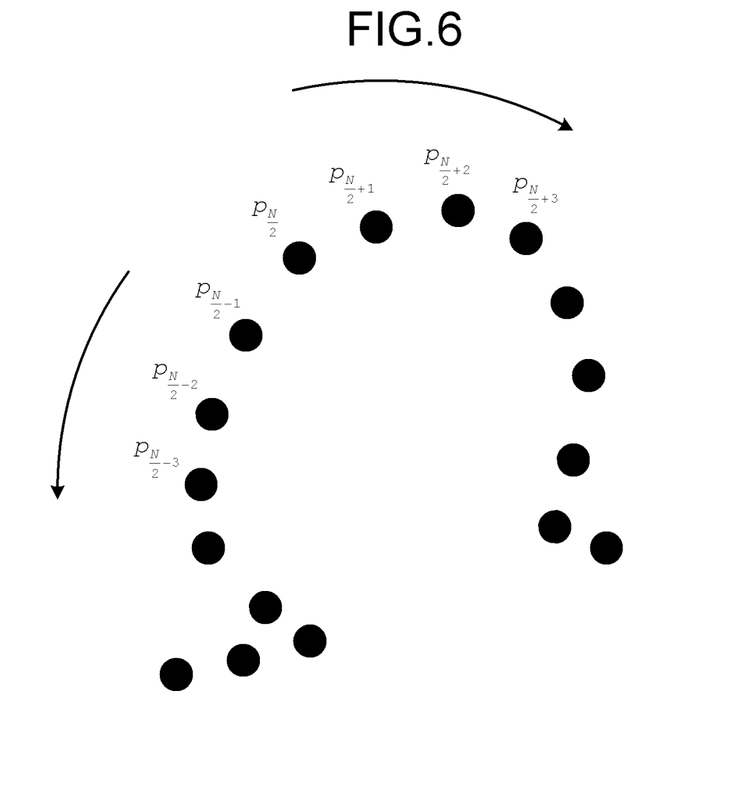
FIG. 6 is an explanatory diagram illustrating an exemplary method of selecting pairs of points according to the first embodiment.

For example, as illustrated in FIG. 6, from a center point $p_{N/2}$ of the point sequence P, the first calculating unit 13 can shift one point at a time on both sides for M number of times and select the pair of two points $p_x$ and $p_y$ for M ($M \geq 1$) number of times. In this case, in the selection for the first time, points $p_x = p_{N/2-1}$ and $p_y = p_{N/2+1}$ are selected. Then, in the selection for the second time, points $p_x = p_{N/2-2}$ and $p_y = p_{N/2+2}$ are selected. Thus, in the selection for the M-th time, points $p_x = p_{N/2-M}$ and $p_y = p_{N/2+M}$ are selected.

Figure 7:
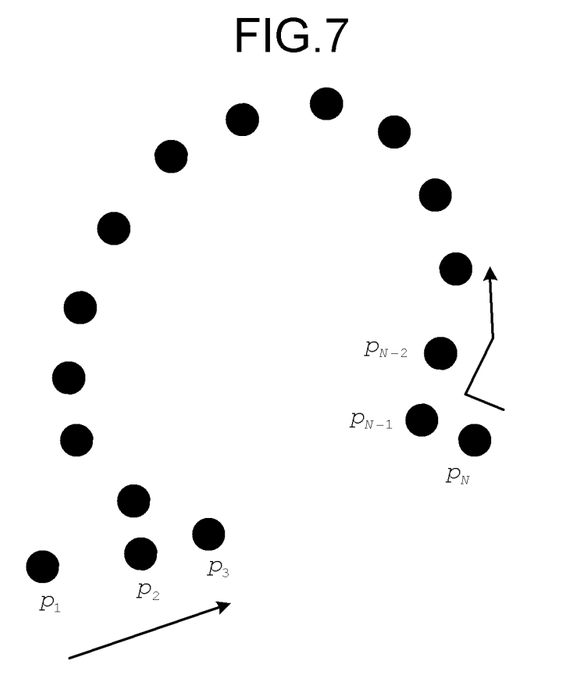
FIG. 7 is an explanatory diagram illustrating an exemplary method of selecting pairs of points according to the first embodiment.

Alternatively, for example, as illustrated in FIG. 7, from a start point $p_1$ as well as an end point $p_N$ of the point sequence P, the first calculating unit 13 can shift one point at a time on the inward side for M ($M \geq 1$) number of times and select the pair of two points $p_x$ and $p_y$ for M number of times. In this case, in the selection for the first time, points $p_x = p_1$ and $p_y = p_N$ are selected. Then, in the selection for the second time, points $p_x = p_2$ and $p_y = p_{N-1}$ are selected. Thus, in the selection for the M-th time, points $p_x = p_M$ and $p_y = p_{N-M+1}$ are selected.

Still alternatively, for example, the first calculating unit 13 can select the pair of two points $p_x$ and $p_y$ in a random manner for M ($M \geq 1$) number of times from the point sequence P. In this case, the first calculating unit 13 can use a $p_x$ random number generator and a $p_y$ random number generator that randomly return a value between 1 to N. Herein, the random number generators can be implemented using either software or hardware.

Subsequently, for each of M number of pairs of the points $p_x$ and $p_y$, the first calculating unit 13 calculates an angle $\theta_{xy}$ (an example of the value related to the curvature) that is formed by the reference point $p_b$, the point $p_x$, and the point $p_y$; and thus obtains M number of angles $\theta_{xy}$ ($\theta_1, \ldots, \theta_M$). More particularly, the first calculating unit 13 sets a vector $\overrightarrow{p_b p_x} = (x_{bx}, y_{bx})$, which joins the reference point $p_b$ and the point $p_x$, and sets a vector $\overrightarrow{p_b p_y} = (x_{by}, y_{by})$, which joins the reference point $p_b$ and the point $p_y$, to thereby calculate the angle $\theta_{xy}$ formed by the two vectors.

Herein, the angle $\theta_{xy}$ can be obtained using the inner product, the cross product, or the inverse function of tan. For example, in the case of obtaining the angle $\theta_{xy}$ using the inner product, Equations (1) and (2) are used. In the case of obtaining the angle $\theta_{xy}$ using the cross product, Equations (3) and (4) are used. In the case of obtaining the angle $\theta_{xy}$ using the inverse function of tan, Equation (5) is used.

$$\cos\theta_{xy} = \frac{\overrightarrow{p_b p_x} \cdot \overrightarrow{p_b p_y}}{|\overrightarrow{p_b p_x}||\overrightarrow{p_b p_y}|} \tag{1}$$

$$\theta_{xy} = \arccos(\cos\theta_{xy}) \tag{2}$$

$$\sin\theta_{xy} = \frac{|\overrightarrow{p_b p_x} \times \overrightarrow{p_b p_y}|}{|\overrightarrow{p_b p_x}||\overrightarrow{p_b p_y}|} \tag{3}$$

$$\theta_{xy} = \arcsin(\sin\theta_{xy}) \tag{4}$$

$$\theta_{xy} = \arctan\left(\frac{y_{by} - y_{bx}}{x_{by} - x_{bx}}\right) \tag{5}$$

For example, assume that the first calculating unit 13 sets the reference point $p_b$ to the center point $p_{N/2}$ of the point sequence P (see FIG. 2); and shifts one point at a time on both sides of the center point $p_{N/2}$ of the point sequence P for M number of times, to thereby select the pair of two points $p_x$ and $p_y$ for M number of times (see FIG. 6).

Figure 8:
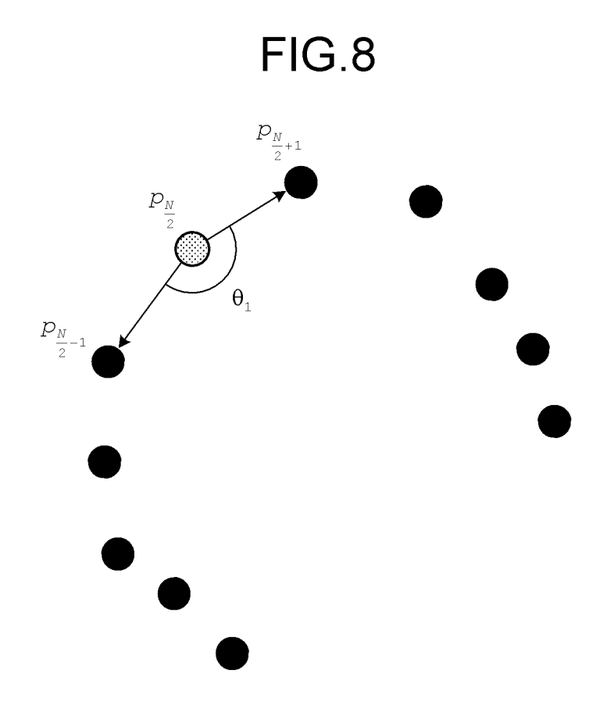
FIG. 8 is an explanatory diagram illustrating an exemplary method of calculating an angle according to the first embodiment.
Figure 9:
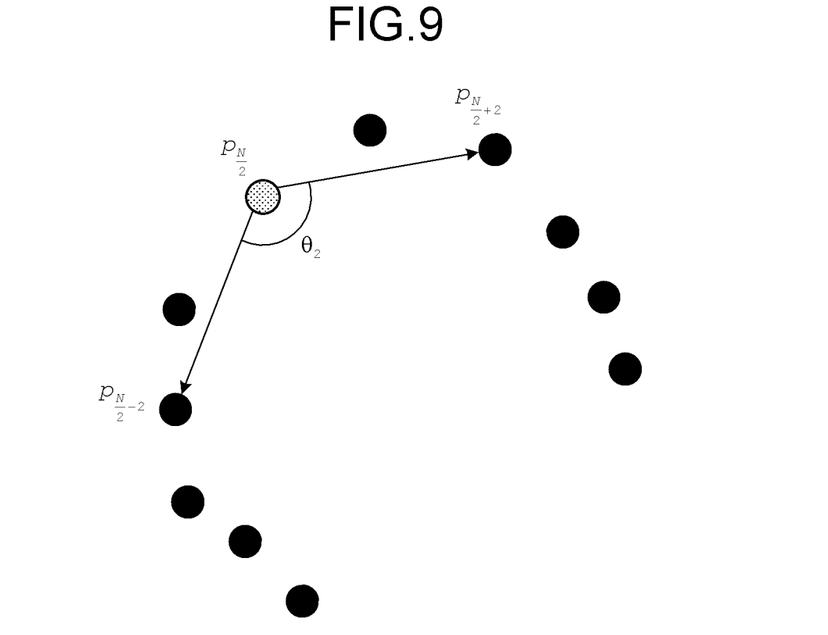
FIG. 9 is an explanatory diagram illustrating an exemplary method of calculating an angle according to the first embodiment.
Figure 10:
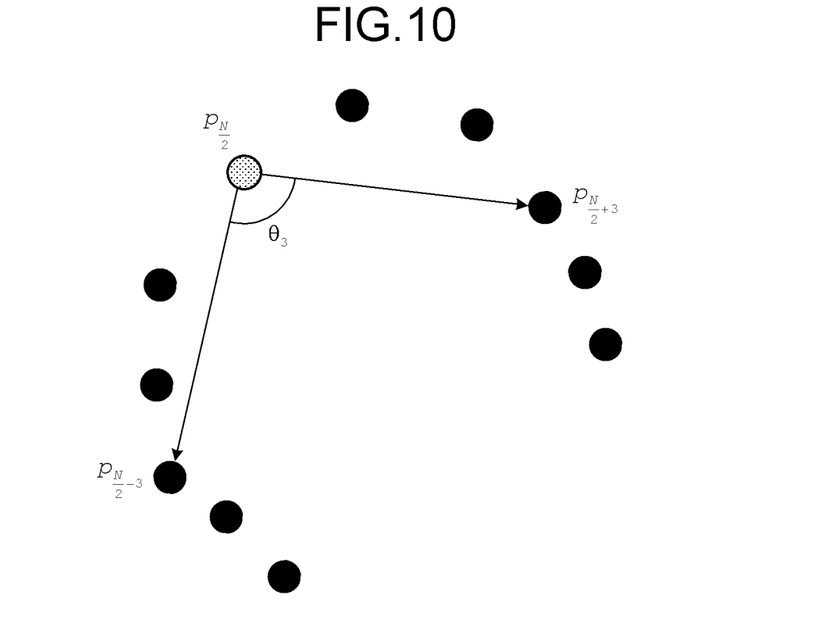
FIG. 10 is an explanatory diagram illustrating an exemplary method of calculating an angle according to the first embodiment.

In this case, in the selection for the first time, the points $p_x = p_{N/2-1}$ and $p_y = p_{N/2+1}$ are selected. Hence, as illustrated in FIG. 8, the first calculating unit 13 calculates the angle $\theta_1$ formed by the points $p_{N/2-1}$, $p_{N/2}$, and $p_{N/2+1}$ as the angle $\theta_{xy}$. Then, in the selection for the second time, the points $p_x = p_{N/2-2}$ and $p_y = p_{N/2+2}$ are selected. Hence, in an identical manner, as illustrated in FIG. 9, the first calculating unit 13 calculates the angle $\theta_2$ formed by the points $p_{N/2-2}$, $p_{N/2}$, and $p_{N/2+2}$ as the angle $\theta_{xy}$. Then, in the selection for the third time, points $p_x = p_{N/2-3}$ and $p_y = p_{N/2+3}$ are selected. Hence, in an identical manner, as illustrated in FIG. 10, the first calculating unit 13 calculates the angle $\theta_3$ formed by the points $p_{N/2-3}$, $p_{N/2}$, and $p_{N/2+3}$ as the angle $\theta_{xy}$.

Subsequently, the first calculating unit 13 extracts feature quantities based on the M number of angles $\theta_{xy}$. The feature quantities can be considered to be from the first feature quantity to the C-th feature quantity; and each feature quantity can be set to be, for example, at least any one of the average of the M number of angles $\theta_{xy}$, the dispersion of the M number of angles $\theta_{xy}$, the standard deviation of the M number of angles $\theta_{xy}$, the largest value among the M number of angles $\theta_{xy}$, the intermediate value among the M number of angles $\theta_{xy}$, and the smallest value among the M number of angles $\theta_{xy}$.

Herein, an average $\overline{\theta}$ of the M number of angles $\theta_{xy}$ is obtained using Equation (6); a dispersion $s^2$ of the M number of angles $\theta_{xy}$ is obtained using Equation (7); and a standard deviation s of the M number of angles $\theta_{xy}$ is obtained by calculating the square root of the value obtained from Equation (7).

$$\overline{\theta} = \frac{1}{M}\sum_{i=1}^{M}\theta_i \qquad (6)$$

$$s^2 = \frac{1}{M}\sum_{i=1}^{M}(\theta_i - \overline{\theta})^2 \qquad (7)$$

In the first embodiment, the explanation is given under the assumption that "C" is equal to two; and that the first feature quantity is the average of the M number of angles $\theta_{xy}$ and the second feature quantity is the standard deviation of the M number of angles $\theta_{xy}$. However, that is not the only possible case. Alternatively, for example, "C" can be set to six so that the first feature quantity can be the average of the M number of angles $\theta_{xy}$, the second feature quantity can be the dispersion of the M number of angles $\theta_{xy}$, the third feature quantity can be the standard deviation of the M number of angles $\theta_{xy}$, the fourth feature quantity can be the largest value among the M number of angles $\theta_{xy}$, the fifth feature quantity can be the intermediate value among the M number of angles $\theta_{xy}$, and the sixth feature quantity can be the smallest value among the M number of angles $\theta_{xy}$.

The second calculating unit 15 calculates a histogram that represents the distribution (frequency) of the feature quantities calculated for each of a plurality of point sequences by the first calculating unit 13. More particularly, the second calculating unit 15 calculates a co-occurrence histogram that represents the co-occurrence distribution of the first feature quantity to the C-th feature quantity calculated for each of a plurality of point sequences by the first calculating unit 13.

In concrete terms, firstly, the second calculating unit 15 performs quantization and discretization of the first feature quantity (i.e., the average of the M number of angles $\theta_{xy}$) and the second feature quantity (i.e., the standard deviation of the M number of angles $\theta_{xy}$) that are calculated for each of a plurality of point sequences by the first calculating unit 13.

For example, from the first feature quantity calculated for each of a plurality of point sequences by the first calculating unit 13, the second calculating unit 15 identifies the range of values that the first feature quantities can take and divides the range into K (K≥2) number of sub-ranges. Then, from among the K number of sub-ranges, depending on the sub-range to which belongs the first feature quantity of each of a plurality of point sequences, the second calculating unit 15 converts the first feature quantity into a value between 1 to K.

In an identical manner, from the second feature quantity calculated for each of a plurality of point sequences by the first calculating unit 13, the second calculating unit 15 identifies the range of values that the second feature quantities can take and divides the range into T (T≥2) number of sub-ranges. Then, from among the T number of sub-ranges, depending on the sub-range to which belongs the second feature quantity of each of a plurality of point sequences, the second calculating unit 15 converts the second feature quantity into a value between 1 to T.

However, the quantization and discretization of the feature quantities is not limited to this example. Alternatively, for example, a method can be implemented in which a hash function is used to convert the feature quantities into hash values. Still alternatively, a different quantization and discretization method can be implemented for the first feature quantities than the quantization and discretization method implemented for the second feature quantities. Moreover, the values of K and T can either be same or be different.

Figure 11:
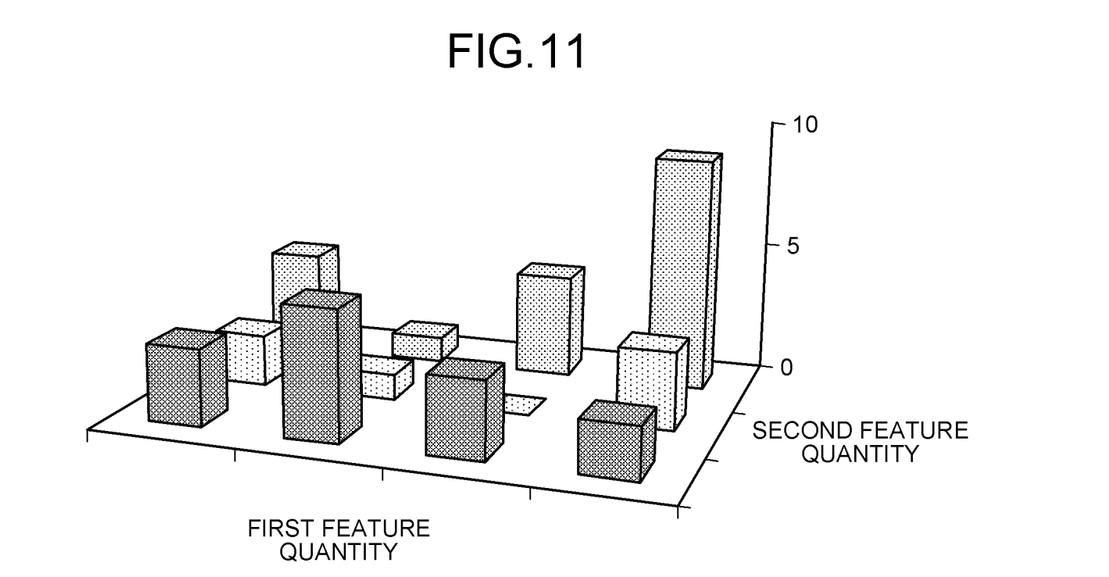
FIG. 11 is a diagram illustrating an example of a co-occurrence histogram according to the first embodiment.

Subsequently, from among K×T number of bins in a two-dimensional matrix that is identified by the range of K number of values which the first feature quantities can take and the range of T number of values which the second feature quantities can take, the second calculating unit 15 identifies the bins for each of a plurality of point sequences in the matrix using the quantized and discretized first feature quantities as well as using the quantized and discretized second feature quantities of the point sequence; and polls a value to the identified bins. The polled value can be a value as a unit such as "1" or can be values weighted with the length of the corresponding point sequence. As a result, as illustrated in FIG. 11, a two-dimensional co-occurrence histogram is calculated in which the first feature quantities and the second feature quantities represent the axes.

In the two-dimensional co-occurrence histogram, one or more feature quantities of a plurality of point sequences constituting the point sequence group are taken into consideration. Hence, the two-dimensional co-occurrence histogram represents the features of the entire point sequence group.

The output unit 17 outputs the histogram, which has been calculated by the second calculating unit 15, either to a memory unit installed in the feature calculation device 10 or to an external device installed on the outside of the feature calculation device 10.

Figure 12:
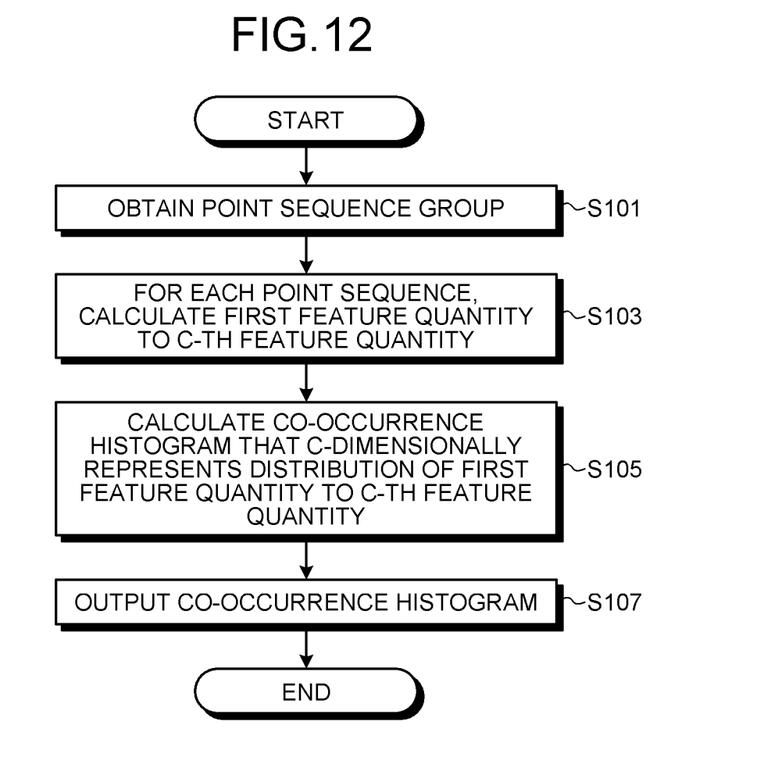
FIG. 12 is a flowchart for explaining an exemplary feature calculation operation performed according to the first embodiment.

FIG. 12 is a flowchart for explaining an exemplary sequence of operations during a feature calculation operation performed in the feature calculation device 10 according to the first embodiment.

Firstly, the obtaining unit 12 obtains a point sequence group that is a set of point sequences input from the input unit 11 (Step S101).

Then, for each of a plurality of point sequences constituting the point sequence group obtained by the obtaining unit 12, the first calculating unit 13 calculates a plurality of values, which is related to the curvature of the shape identified by the point sequence, with the reference point of the point sequence as the reference; and calculates a first feature quantity to a C-th feature quantity based on the calculated values (Step S103).

Subsequently, the second calculating unit 15 calculates a C-dimensional co-occurrence histogram that represents the co-occurrence distribution (frequency) of the first feature quantity to the C-th feature quantity that are calculated for each of a plurality of point sequences by the first calculating unit 13 (Step S105).

Then, the output unit 17 outputs the co-occurrence histogram calculated by the second calculating unit 15 (Step S107).

As described above, according to the first embodiment, one or more feature quantities are calculated for a plurality of point sequences constituting a point sequence group; and a histogram is calculated that represents the distribution (frequency) of the one or more feature quantities calculated for each of a plurality of point sequences. Hence, in the calculated histogram, one or more feature quantities of a plurality of point sequences constituting the point sequence group are taken into consideration. As a result, the histogram represents the features of the entire point sequence group (i.e., represents the features of all sets of point sequences).

Particularly, in the first embodiment, for each of a plurality of point sequences constituting a point sequence group; a plurality of values, which is related to the curvature of the shape identified by that point sequence, is calculated with the reference point of that point sequence as the reference; and one or more feature quantities are calculated based on the calculated values. For that reason, according to the first embodiment, one or more feature quantities of each of a plurality of point sequences constituting the point sequence group are one-dimensional in nature. As a result, it becomes possible to reduce the volume of data. Consequently, the features of the entire point sequence group (i.e., the features of all sets of point sequences) can be represented while holding down the volume of data.

In this way, according to the first embodiment, even in the case of performing operations such as a matching operation with the use of feature quantities that represent the features of the entire point sequence group, it becomes possible to hold down the processing load as well as to enhance the processing speed.

Second Embodiment

In a second embodiment, the explanation is given for an example in which normalization of the histogram is performed. The following explanation is given with the focus on the differences with the first embodiment. Thus, the constituent elements having identical functions to the first embodiment are referred to by the same names/reference numerals, and the explanation thereof is not repeated.

Figure 13:
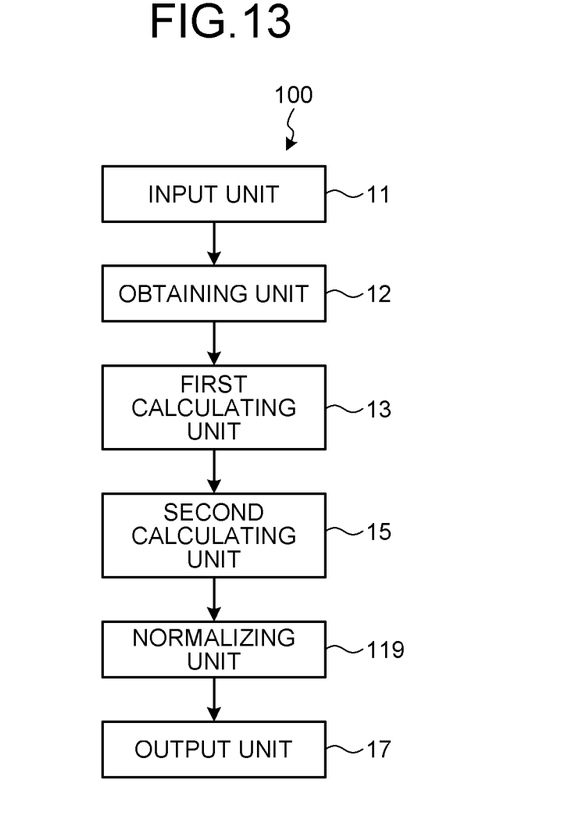
FIG. 13 is a configuration diagram illustrating an example of a feature calculation device according to a second embodiment.

FIG. 13 is a configuration diagram illustrating an example of a feature calculation device 100 according to the second embodiment. As illustrated in FIG. 13, in the feature calculation device 100 according to the second embodiment, a normalizing unit 119 is different than the first embodiment.

The normalizing unit 119 normalizes the histogram calculated by the second calculating unit 15. Herein, the normalizing unit 119 normalizes a co-occurrence histogram using, for example, Equation (8).

$$e_{ij}' = e_{ij}/E \qquad (8)$$

In Equation (8), $e_{ij}$ represents each element of the co-occurrence histogram and $e_{ij}'$ represents each element of the normalized co-occurrence histogram. Moreover, E represents a normalization value and can be, for example, the total number of point sequences or the total length of the point sequence group. Alternatively, E can be a length $L_x$ of the rectangular area enclosing the point sequence group, or can be a height $L_y$ of the rectangular area, or can be a dimension S of the rectangular area. In this case, if each of R number of points included in the point sequence group is represented as $(x_i, y_i)$; then $L_x = x_{imax} - x_{imin}$ is satisfied, $L_y = y_{imax} - y_{imin}$ is satisfied, and $S = L_x L_y$ is satisfied. Herein, $x_{imax}$ represents the largest value of $x_i$ and $x_{imin}$ represents the smallest value of $x_i$; while $y_{imax}$ represents the largest value of $y_i$ and $y_{imin}$ represents the smallest value of $y_i$.

Figure 14:
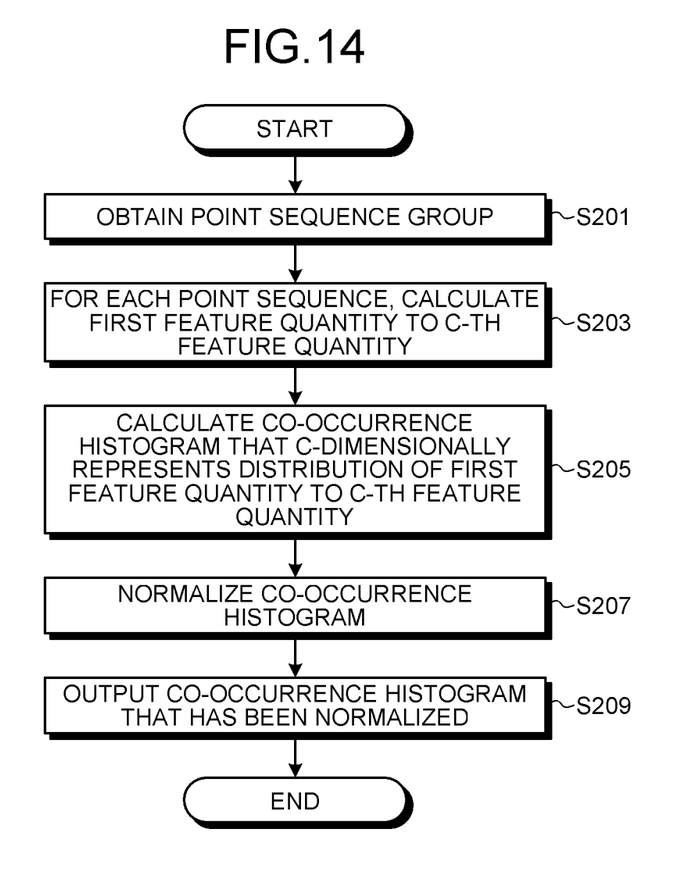
FIG. 14 is a flowchart for explaining an exemplary feature calculation operation performed according to the second embodiment.

FIG. 14 is a flowchart for explaining an exemplary sequence of operations during a feature calculation operation performed in the feature calculation device 100 according to the second embodiment.

Firstly, the operations performed from Steps S201 to S205 are identical to the operations performed from Steps S101 to S105 according to the flowchart illustrated in FIG. 12.

Then, the normalizing unit 119 normalizes the co-occurrence histogram calculated by the second calculating unit 15 (Step S207).

Subsequently, the output unit 17 outputs the co-occurrence histogram that has been normalized by the normalizing unit 119 (Step S209).

Modification Example

In the embodiments described above, the explanation is given for an example in which point sequences represent strokes and a point sequence group represents handwritten data. However, that is not the only possible case. Alternatively, for example, a point sequence can represent the movement locus of a single mobile object, and the point sequence group can represent the movement loci of a plurality of mobile objects.

For example, if the mobile objects are balloons, then the obtaining unit 12 obtains a point sequence group that represents the movement locus of each of a plurality of balloons. In order to obtain the movement loci of balloons, it is possible to implement the method disclosed in, for example, A. Stohl, "Computation, accuracy and applications of trajectories—a review and bibliography," Atmospheric Environment, vol. 32, no. 6, pp. 947-966, 1998.

For example, each of a plurality of balloons can be equipped with a radiosonde (an example of the input unit 11) that is a balloon-type metrological instrument. With that, the obtaining unit 12 can obtain, as a point sequence, the time-series positions of each balloon measured by the corresponding radiosonde; and can obtain the point sequence group.

Meanwhile, for example, if the mobile objects are persons, then the obtaining unit 12 obtains a point sequence group representing the movement locus of each of a plurality of persons. In order to obtain the movement loci of persons, it is possible to implement the method disclosed in, for example, M. C. Gonzalez, et al., "Understanding individual human mobility patterns," Nature, pp. 779-782, 2008.

For example, each of a plurality of persons can possess a device such as a smartphone (an example of the input unit 11) that is equipped with the global position system (GPS) functionality. With that, the obtaining unit 12 can obtain, as a point sequence, the time-series positions of each person measured by the corresponding device, to thereby obtain the point sequence group.

Hardware Configuration

Figure 15:
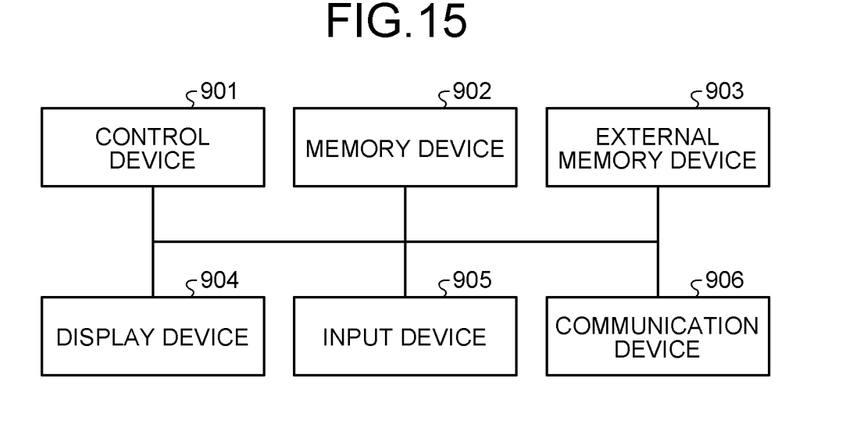
FIG. 15 is a diagram illustrating an exemplary hardware configuration of the feature calculation device according to the embodiments and a modification example.

FIG. 15 is a diagram illustrating an exemplary hardware configuration of the feature calculation device 100 according to the embodiments and the modification example described above. Herein, the feature calculation device 10 according to the embodiments and the modification example described above has the hardware configuration of a commonly-used computer that includes a control device 901 such as a central processing unit (CPU); a memory device 902 such as a read only memory (ROM) or a random access memory (RAM); an external memory device 903 such as a hard disk drive (HDD); a display device 904 such as a display; an input device 905 such as a keyboard or a mouse; and a communication device 906 such as a communication interface.

Meanwhile, the computer programs that are executed in the feature calculation device 10 according to the embodiments and the modification example described above are recorded in the form of installable or executable files in a computer-readable recording medium such as a compact disk read only memory (CD-ROM), a compact disk readable (CD-R), a memory card, a digital versatile disk (DVD), or a flexible disk (FD).

Alternatively, the computer programs that are executed in the feature calculation device 10 according to the embodiments and the modification example described above can be saved as downloadable files on a computer connected to the Internet or can be made available for distribution through a network such as the Internet. Still alternatively, the feature calculation device 10 according to the embodiments and the modification example described above can be stored in advance in a ROM.

Meanwhile, the computer programs that are executed in the feature calculation device 10 according to the embodiments and the modification example described above contain a module for each of the abovementioned constituent elements to be implemented in a computer. As the actual hardware, for example, a CPU reads the computer programs from an HDD and runs them such that the computer programs are loaded in a RAM. As a result, the module for each of the abovementioned constituent elements is implemented in the computer.

Unless contrary to the nature thereof, the steps of the flowcharts according to the embodiments described above can have a different execution sequence, can be executed in plurality at the same time, or can be executed in a different sequence every time.

As described above, according to the embodiments and the modification example described above, it becomes possible to represent the features of a point sequence group while holding down the volume of data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A feature calculation device comprising:
   an obtaining unit configured to obtain a point sequence group comprising a set of point sequences in which a sequence of a plurality of points is fixed;
   a first calculator configured to, for each of the point sequences in the point sequence group, calculate a plurality of values related to a curvature of a shape of the point sequence, with a reference point with respect to the point sequence as a reference, and calculate feature quantities based on the plurality of calculated values; and
   a second calculator configured to calculate a histogram representing a distribution of the feature quantities of each of the point sequences, wherein
   for each of the point sequences, the first calculator is configured to calculate each feature quantity of one to C (where $C \geq 1$), and
   as the histogram, the second calculator is configured to calculate a co-occurrence histogram that represents a co-occurrence distribution of the first feature quantity to the C-th feature quantity of each of the point sequences,
   wherein the obtaining unit is one of a touch-sensitive panel, a touch-pad, a mouse or an electronic pen, and
   wherein the point sequences constituting the point sequence group represent a plurality of strokes entered when a stylus pen or a finger makes contact with an input screen.

2. The device according to claim 1, wherein, for each of the point sequences, the second calculator is configured to poll a value weighted with the length of the point sequence, to bins in which feature quantities from the first feature quantity to the C-th feature quantity of the point sequence co-occur, to thereby calculate the co-occurrence histogram.

3. The device according to claim 1, further comprising a normalizing unit configured to normalize the calculated histogram.

4. The device according to claim 1, wherein the first calculator is configured to set the reference point to any one of points in each of the point sequences.

5. The device according to claim 1, wherein the first calculator is configured to set the reference point to a point other than points in the point sequences.

6. A feature calculation method comprising:
   obtaining, by an obtaining unit, a point sequence group comprising a set of point sequences in which a sequence of a plurality of points is fixed;
   calculating, by a first calculator, for each of the point sequences in the point sequence group, a plurality of values related to a curvature of a shape of the point sequence, with a reference point with respect to the point sequence as a reference, and calculating feature quantities based on the plurality of calculated values; and
   calculating, by a second calculating unit, a histogram representing a distribution of the feature quantities of each of the point sequences, wherein
   for each of the point sequences, each feature quantity of one to C (where $C \geq 1$) is calculated by the first calculator, and
   as the histogram, a co-occurrence histogram is calculated by the second calculator, the co-occurrence histogram representing a co-occurrence distribution of the first feature quantity to the C-th feature quantity of each of the point sequences,
   wherein the obtaining unit is one of a touch-sensitive panel, a touch-pad, a mouse or an electronic pen, and
   wherein the point sequences constituting the point sequence group represent a plurality of strokes entered when a stylus pen or a finger makes contact with an input screen.

7. A computer program product comprising a non-transitory computer readable medium including program instructions, wherein the instructions, when executed by a computer, cause the computer to:
   obtain a point sequence group comprising a set of point sequences in which a sequence of a plurality of points is fixed;
   calculate, for each of the point sequences in the point sequence group, a plurality of values related to a curvature of a shape of the point sequence, with a reference point with respect to the point sequence as a reference, and calculating feature quantities based on the plurality of calculated values; and calculate a histogram which representing a distribution of the feature quantities of each of the point sequences, wherein for each of the point sequences, each feature quantity of one to C (where $C \geq 1$) is calculated, and as the histogram, a co-occurrence histogram is calculated, the co-occurrence histogram representing a co-occurrence distribution of the first feature quantity to the C-th feature quantity of each of the point sequences, wherein the point sequences constituting the point sequence group represent a plurality of strokes entered when a stylus pen or a finger makes contact with a touch input screen.

* * * * *